United States Patent
Kant et al.

[15] 3,663,844
[45] May 16, 1972

[54] ASYNCHRONOUS MACHINE HAVING AN OPEN MAGNETIC CIRCUIT

[72] Inventors: Michel Kant, Paris; Robert Bonnefille, Issy-les-Moulineaux, both of France

[73] Assignee: ANVAR Agence Nationale De Valorisation De La Recherche, Tour Aurore, Paris-Defense, Courbevare, France

[22] Filed: Mar. 15, 1971

[21] Appl. No.: 124,359

[30] Foreign Application Priority Data

Mar. 13, 1970 France..................................7009032

[52] U.S. Cl.............................................................310/13
[51] Int. Cl. .....................................................H02k 41/02
[58] Field of Search ............................310/12–14, 198–207; 318/135, 121

[56] References Cited

FOREIGN PATENTS OR APPLICATIONS

| 889,420 | 2/1962 | Great Britain..........................310/13 |
| 750,767 | 6/1956 | Great Britain..........................310/13 |
| 906,712 | 9/1962 | Great Britain..........................310/12 |

*Primary Examiner*—D. F. Duggan
*Attorney*—Holcombe, Wetherill & Brisebois

[57] ABSTRACT

Asynchronous machine having an open magnetic circuit comprises a field member including central and end sections. The central section is fully wound with a polyphase winding and a monophase winding. The end sections are unwound or partially wound with a monophase winding. The central section has an odd or fractional number of poles and the length of the end sections are from zero to 1 pole pitch long.

3 Claims, 1 Drawing Figure

Patented May 16, 1972
3,663,844
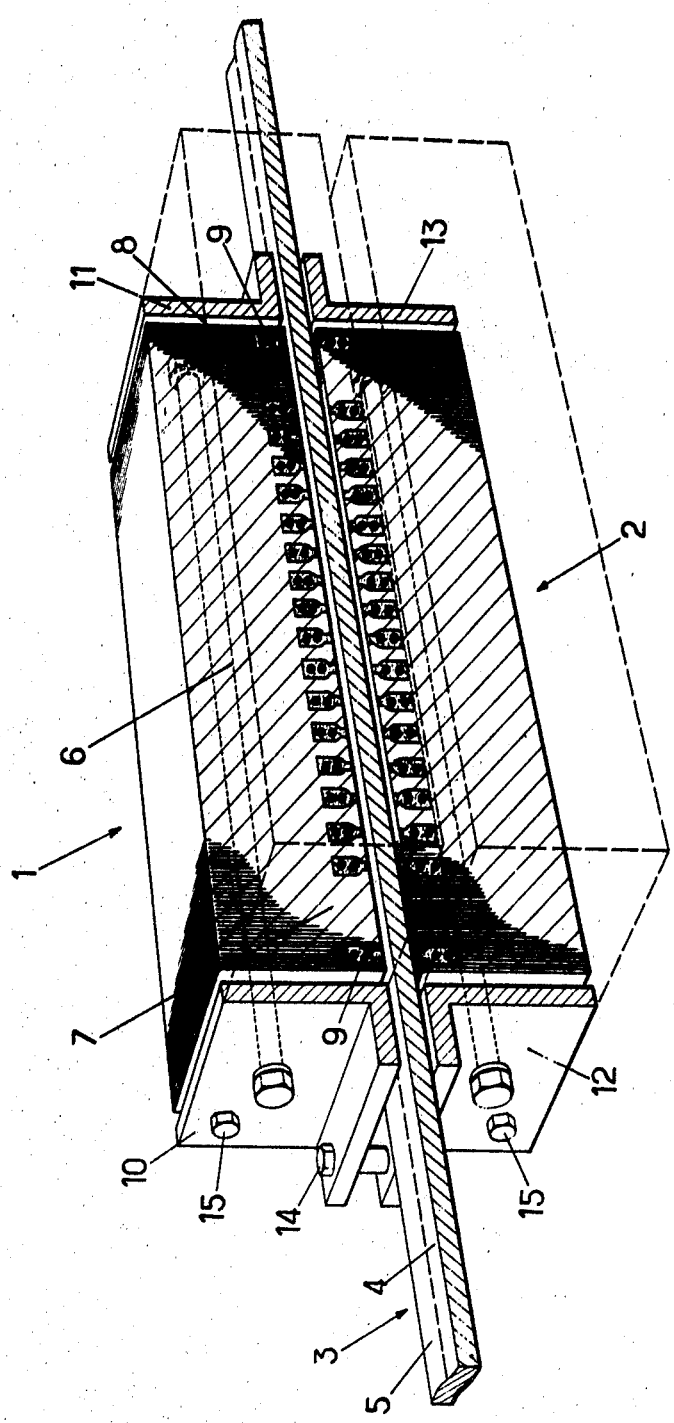

ASYNCHRONOUS MACHINE HAVING AN OPEN MAGNETIC CIRCUIT

SUMMARY OF THE INVENTION

This invention relates to an asynchronous machines having an open magnetic circuit adapted to transform electrical energy into translational mechanical energy and vice versa, such for example, as linear induction machines.

The disadvantages inherent in linear machines are connected principally with transverse and longitudinal distortions of the magnetic field in the air gap and with parasitic currents which form outside the active part of the armature.

In order to decrease the transverse distortion it is known to provide an air gap which is small relative to the pole pitch.

It is also known to eliminate longitudinal distortion by suppressing the parasitic components of the induction field by means of a special field winding. In such a machine, the object is to produce a purely sliding magnetic field, in the air gap by providing a symmetrical polyphase winding extending the full length of the magnetic circuit, a continuously distributed monophase winding and finally, two symmetrical end zones having at each end a monophase winding.

The asynchronous machine having an open circuit according to the invention makes it possible to produce an output of energy which is greater than those of known machines without necessarily relying on a purely sliding magnetic field.

The asynchronous machine according to the invention also makes it possible to improve the operating characteristics of conventional machines by providing for a more progressive and efficaceous braking when it operates as a motor, and producing an improvement in the hydraulic conditions at the input and output of the machine when it operates as a magnetohydrodynamic generator.

The asynchronous machine having an open circuit according to the invention has a relatively movable armature and fielding winding. The field winding may be divided into several magnetic sections. A completely wound central section comprises a polyphase winding and a monophase winding continuously distributed along the central section, the number of poles being odd or fractional. A fractional number of poles may be provided by introducing into the same slot conductors corresponding to several different poles. On each end of this central section there is a partially wound or, preferably, a completely unwound end section having a monophase winding at its end. The length of each of these sections, as well as the phase and amplitudes of the excitation currents carried by the various windings are determined in dependence on the nominal power and operating conditions of the machine.

To limit the armature losses due to the Joule effect the end windings are wound around the magnetic former in such a way as to produce a pulsating field concentrated at the ends of the field member, whereas the windings of the central zone are wound around the poles in a conventional manner, that is to say, using frontal connections.

For given operating conditions and power, the output is at a maximum for certain lengths of the partially wound or unwound sections. This length nevertheless necessarily falls between zero and 1 pole pitch.

The monophase windings at the ends of the unwound or partially wound zones impart a shape to the magnetic field which produces maximum output and supplements the energizing force of the principal magnetic field.

It should be noted that the object is not to produce a zero magnetic field at the ends of the field member. It has, on the contrary, been found that the magnetic field leading to the most effective electromagnetic conversion, that is to say, the greatest efficiency, is not zero at the ends of the field member.

Finally, two unwound sections are mounted perpendicularly to the direction of movement of the field winding and attached at a small distance therefrom. These constitute a magnetic screen preventing the circulation of parasitic currents in the armature. The gap between these last unwound sections and the unwound or partially wound sections is dependent upon the reactive current in the armature, that is to say, it is a function of the load of the machine.

In another embodiment of the linear machine according to the invention, the armature is movable with respect to the field, which has otherwise the same structure as before.

The single FIGURE of the attached drawing illustrates, by way of example, one embodiment of the linear induction motor according to the invention. The drawing is a perspective view, of a section taken along the path of travel of the primary.

As shown, the machine comprises a field winding comprising two symmetrical parts 1 and 2 and an armature 3. The armature is stationary and the field winding moves translationally with respect thereto. The armature comprises an active central part 4 which serves a purpose analogous to that of the straight part of the rotor windings of rotating machines and closing bars 5 serve the role of the heads of the coils of conventional windings. The parts 1 and 2 of the movable field comprise a stack of insulated magnetic laminations which may be divided into several sections. A central section 6 is completely wound and provided with a polyphase winding and a monophase winding continuously distributed along the central section 6 and has an odd number of poles.

Two unwound end sections 7 and 8 have lengths which may be deduced from the nominal operating conditions of the machine. The unwound end sections have at their end a monophase winding 9. The windings 9 produce a pulsating field concentrated at the ends of the inductor, and are wound around the magnetic former of the field member instead of around the poles as in the case of the central part 6. This arrangement avoids excessive losses in the armature 3 due to the Joule effect.

On the end surfaces of the field winding 1 are two end plates 10 and 11 slightly spaced from the field winding and attached by means of pins made of fiberglass or some other non-magnetic material and bolts 15. These plates serve to close the magnetic circuit and are divided to permit the passage of the armature 3. They are attached to the similar plates 12 and 13 of the field winding 2 by means of bolts 14.

The asynchronous machine having an open magnetic circuit according to the invention may be utilized to pull a vehicle, with the armature acting as a rail. It may be also used for magnetohydrodynamic purposes, in which case the field winding is stationary and the armature is a stream of liquid metal. It may operate as either a generator or as a motor.

What is claimed is:

1. In an asynchronous machine having an open magnetic circuit comprising a field member and an armature which are movable with respect to each other, the field member being wound on a magnetic former and comprising a magnetic circuit including a central section having a polyphase winding and a monophase winding continuously distributed along the central section and two at most partially wound end sections which are symmetrical about an axis perpendicular to the direction of relative movement between the field member and the armature, and said field member comprising a monophase winding at the outer end of each end section, the improvement according to which the central section of the field member comprises an uneven number of poles, the end windings are wound around about the magnetic former of the field member, the phase and amplitude of the exciting currents carried by the various windings and the lengths of the end sections are such that the machine has a maximum output for a given power and conditions of operation, said end section lengths being between zero and 1 pole pitch, and magnetic circuit closing means is mounted on each side of the field member parallel to and at a small distance from the external faces thereof and perpendicular to said direction of relative movement.

2. Linear induction machine as claimed in claim 1 in which said central section of the field member comprises an odd number of poles.

3. Linear induction machine as claimed in claim 1 in which said central section of the inductor comprises a fractional number of poles.

* * * * *